United States Patent [19]

Yamauchi

[11] 4,214,257
[45] Jul. 22, 1980

[54] METHOD AND COLOR TELEVISION PICTURE TUBE FOR REPRODUCING THREE-DIMENSIONAL IMAGE

[75] Inventor: Satoshi Yamauchi, Yokohama, Japan
[73] Assignee: Ricoh Company, Ltd., Tokyo, Japan
[21] Appl. No.: 948,477
[22] Filed: Oct. 4, 1978
[30] Foreign Application Priority Data Nov. 10, 1977 [JP] Japan ............................... 52-121757

[51] Int. Cl.² ........................................... H04N 9/60
[52] U.S. Cl. .......................................... 358/3; 358/92
[58] Field of Search ....................................... 358/3, 92

[56] References Cited

U.S. PATENT DOCUMENTS

| | | | |
|---|---|---|---|
| 2,931,855 | 4/1960 | Abramson | 358/3 |
| 3,529,082 | 9/1970 | Hoesli | 358/92 |
| 3,770,887 | 11/1973 | Van Buskirk | 358/3 |
| 4,145,713 | 3/1979 | White | 358/92 |

*Primary Examiner*—Richard Murray
*Attorney, Agent, or Firm*—Burgess, Ryan and Wayne

[57] ABSTRACT

A method for reproducing a three-dimensional image on a color television picture tube. A right side optical system is used for taking a picture of the right side portion of a subject or a scene while a left side optical system for taking a picture of the left side. The video signals pertaining only to the first and all odd field scannings are derived from the right side optical system while the video signals pertaining only to the second and all even field scannings are derived from the left side optical system. When reproduced, the trios of color dots or strips excited along each of the odd numbered scanning lines are spaced apart from each other by two color dot or strip pitches in the horizontal direction and also spaced apart by one pitch line from the trios of color dots or strips excited along the adjacent even-numbered scanning lines. The trios of color dots or strips excited along all odd or even scanning lines are in line with each other in the vertical direction and spaced apart from each other by one pitch, thus forming straight vertical stripes of the trios of color dots or strips. Thus the vertical stripes of the trios of color dots or strips produced by the scanning of the first and all odd fields and the second and all even fields alternate with each other. When the images reproduced alternately by the scanning of the first and all odd fields and the second and all even fields are viewed through a lenticular lens disposed in front of the phosphor screen of the picture tube, one may perceive a three-dimensional color image. A color television picture tube adapted to carry out the above method is also disclosed.

7 Claims, 12 Drawing Figures

METHOD AND COLOR TELEVISION PICTURE TUBE FOR REPRODUCING THREE-DIMENSIONAL IMAGE

BACKGROUND OF THE INVENTION

The present invention relates to a method for reproducing a three-dimensional color television image and a color television picture tube especially adapted to carry out the above method.

According to a prior art three-dimensional color television system, the right and left side images are alternately reproduced in each frame. A viewer must view through a pair of spectacles provided with shutters which are alternately opened and closed in synchronism with the alternate reproduction of the right and left side images. In another prior art three-dimensional color television system, the right and left side cameras take pictures through filters of different colors, for instance through red and blue filters, and in the reproduction one frame or one field of the right side image and one frame or one field of the left side image are alternately reproduced on the same picture tube. A viewer must wear a pair of spectacles having the same colors as the filters used, for instance, the left eyepiece is red while the right eyepiece is blue.

In either case, it is very cumbersome and inconvenient for viewers to view the image through the specially designed viewing glasses.

SUMMARY OF THE INVENTION

Accordingly, one of the objects of the present invention is to provide a method for reproducing a three-dimensional color television image without the use of a pair of glasses with shutters or a pair of colored glasses.

Another object of the present invention is to provide a color television picture tube especially adapted for carrying out the above method.

Briefly stated, the present invention provides a method for reproducing a three-dimensional color television image comprising the steps of employing a right side optical system and a left side optical system to take a right side picture and a left side picture, respectively, of a subject or a scene in such a way that the video signals obtained by the scanning of the first and all odd fields may be derived only from the right side optical system while the video signals obtained by the scanning of the second and even fields may be derived only from the left side optical system; reproducing alternately the right side image and the left side image by the alternate scanning of the first and all odd fields and the second and all even fields, the scanning of the first or each of odd fields and of the second or each of even fields being such that the trios of color dots or strips excited along each of the odd numbered or even numbered scanning lines are spaced apart from each other by two color dot or strip trip pitches and are spaced apart from the trios of color dots or strips excited along the adjacent even or odd numbered scanning lines by one pitch in the horizontal direction and spaced apart by one pitch from each other in the vertical direction, thus forming vertical stripes of color dot or strip trios which alternate with each other in the case of scanning the first and all odd fields and the second and all even fields; and viewing thus reproduced right and left side images through a lenticular lens disposed in front of the color dot or strip screen within the color television picture tube.

BRIEF DESCRIPTION OF THE ACCOMPANYING DRAWINGS

Same reference numerals are used to designate similar parts throughout the figures.

DESCRIPTION OF THE PREFERRED EMBODIMENTS

Figure 1:
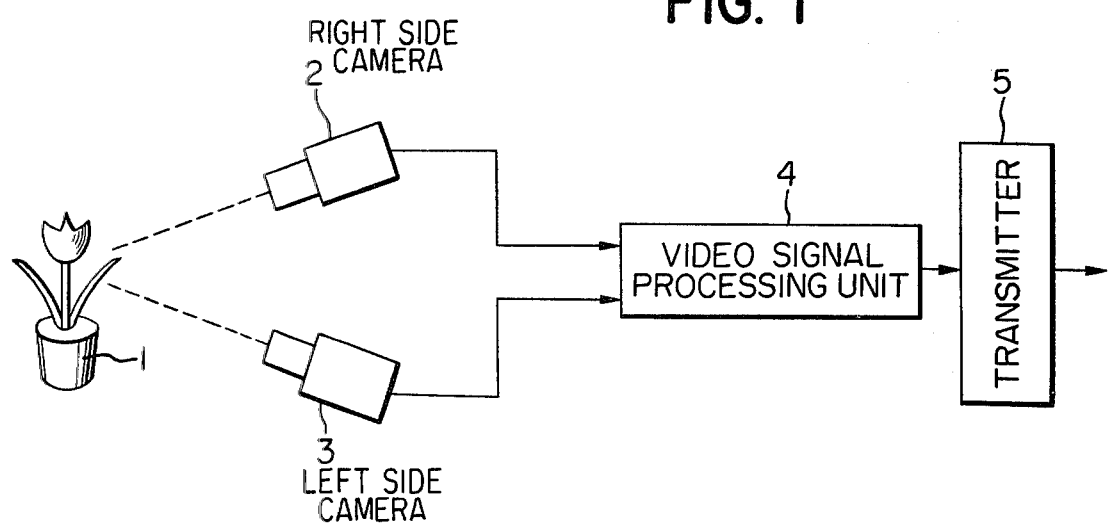
FIG. 1 is a view used for the explanation of a method in accordance with the present invention for reproducing a three-dimensional color television image.

Referring to FIG. 1, reference numeral 1 denotes a subject; 2 and 3, right and left TV cameras; 4, a video signal processing unit; and 5, a transmitter or a video tape recorder.

The right side camera 2 focuses the right front portion of the subject 1 while the left side camera 3 the left front portion thereof. The video signals obtained by scanning the first and all odd fields are derived from the right side camera 2 while the video signals obtained by scanning the second and all even fields are derived from the left side camera 3. These alternately derived odd- and even-numbered field video signals are processed by the video signal processing unit 4 and transmitted from the transmitter 5 or are recorded in the video tape recorder 5.

In reproduction of the picture with a TV picture tube with a single shadow mask, the first and all odd fields and the second and all even fields are traced alternately as shown in FIG. 2(a) or FIG. 3(a). FIG. 2(a) shows the scanning pattern in the case of a three-gun kinescope with a shadow mask for color dot trios while FIG. 3(a) shows the scanning pattern in the case of an in-line three-gun kinescope with a shadow mask for color strip trios. It can be seen that the color dot or strip trios 6 which are excited when the electron beams trace the odd-numbered scanning lines in the first and all odd fields are spaced apart from each other in the horizontal scanning direction by two color dot trio or strip pitches, but they are spaced apart from each other in the vertical directions by one pitch. In like manner, the color dot or strip trios 7 excited when the electron beams trace the even numbered scanning lines in the second and all even fields are spaced apart from each other by two pitches in the horizontal scanning direction, but they are spaced apart from each other by one pitch in the vertical direction. Thus the excited color dot or strip trios 6 and 7 form straight vertical stripes, respectively, which alternate with each other. These geometrical relationship among the color dot or strip trios 6 and 7 are obvious from the positions of apertures of the shadow mask and the deflections of the electron beams for scanning the first and all odd fields and the second and all even fields in the conventional color television receivers.

As shown in FIG. 2(b) or 3(b), the surface of a support 9 opposite to a phosphor-dot screen 8 is formed into a lenticular lens. The pitch or width $S_1$ of each lenticule 10 is made equal to the width $S_2$ of each of the vertical stripes of color dot or strip trios in the first and all odd fields and second and all even fields. The lenticular lens is so positioned relative to the color phosphor-dot or strip screen 8 that the vertical axis of the lenticule 10 may be in line with the vertical boundary line between the vertical strip of the color dot or strip trios 6 of the first and all odd fields and the vertical stripe of the color dot or strip trios 7 of the second and all even fields. Therefore the vertical stripes of color dot or strip trios in each of the first and all odd fields are located on the left side of the vertical axis of the lenticules 10 while the vertical stripes of color dot or strip trios in each of the second and all even fields are located on the right side of the vertical axis of the lenticules 10. Furthermore the lenticular lens is so positioned that its focal points may be located slightly inwardly of the color phosphor-dot or strip screen 8.

Then, the color images produced by the color dot or strip trios when the first and all odd fields are scanned are refracted to the right through the lenticular lens while the color images produced by the color dot or strip trios excited when the second and all even fields are scanned are refracted to the left as shown in FIG. 2(b). When a viewer, therefore, sits in front of the color picture tube, the right side images reproduced by the scanning of the first and all odd fields may be perceived by the right eye, but the left side images reproduced by the scanning of the second and all even fields may be hardly percieved. On the other hand, the left side images reproduced by the scanning of the second and all even fields may be well percieved by the left eye, but the images reproduced by the first and all odd fields are hardly percieved. That is, the viewer sees the right side images with the right eye and the left side images with the left eye so that a three-dimensional image may be reproduced on the picture tube.

Figure 2:
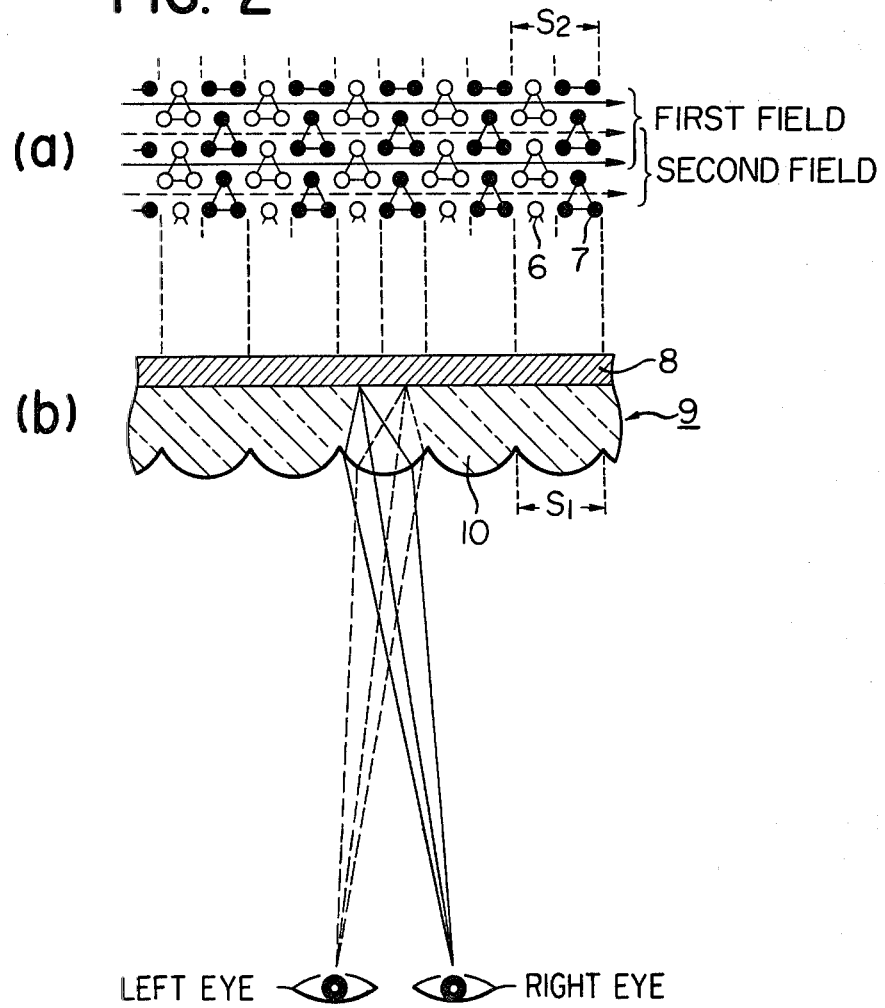
FIGS. 2 and 3 are schematic fragmentary sectional views, on enlarged scale, of color television picture tubes, respectively, used in the present invention.
Figure 3:
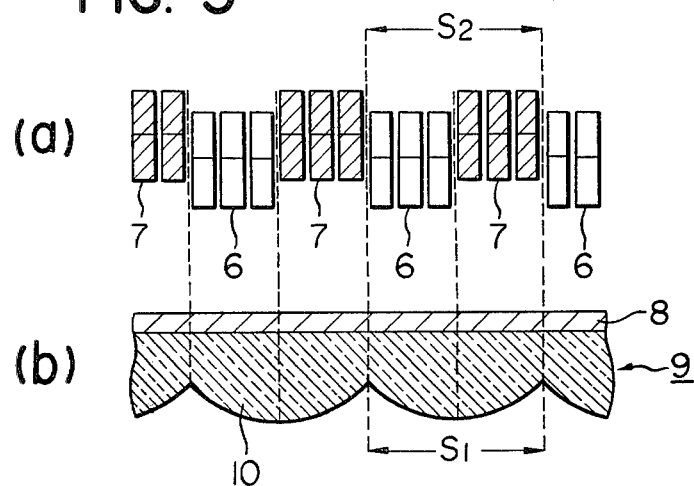
Figure 4:
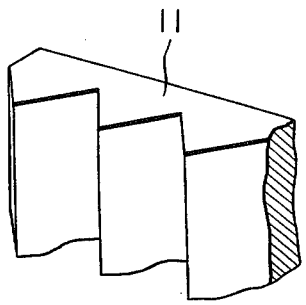
FIG. 4 is a perspective fragmentary view of a lenticular lens which is different in construction from that shown in FIGS. 2 and 3.
Figure 5:
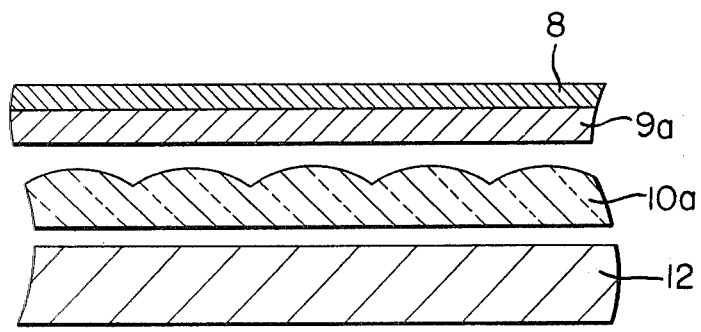
FIG. 5 is a schematic fragmentary view, on enlarged scale, of another embodiment of a color television picture tube used in the present invention.

Instead of the lenticular lens as shown in FIGS. 2 and 3, a prism 11 as shown in FIG. 4 may be used to reproduce a three-dimensional image in a manner substantially similar to that described above.

Instead of forming the front surface of the support 9 into the lenticular lens, a lenticular lens 10a may be formed independently of a support 9a of the color phosphor-dot or strip screen 8 and spaced apart therefrom with its convex faces oriented toward the support 9a. Furthermore, a suitable filler having an index of refraction different from those of the support 9a and the lenticular lens 10a may be interposed between the support 9a and the lenticular lens 10a.

So far the present invention has been described in connection with the reproduction of a three-dimensional image, but it will be understood that the present invention may be equally applied to reproduce two different images simultaneously on the same picture camera. That is, the right and left side cameras 2 and 3 focuse two different subjects, respectively, and the two images are reproduced on the color television picture tube substantially similar in construction to that described above except that the lenticules of the lenticular lens have different focal lengths. Therefore when a viewer views the picture tube from the left he may percieve the image of one subject but when he or she sees the picture tube from the left, the image of the other subject may be percieved.

So far the present invention has been described as employing two TV cameras in order to display the three-dimensional color television images, but it is to be understood that the three-dimensional color television image representation may be effected with only a single TV camera as will be described in detail below.

Interlaced scanning system is universally employed in the color television systems all over the world. In this system the first and second fields are superimposed at the receiver to create a frame or a complete picture as is well known in the art. According to the present invention, the first field is used to picture and reproduce the right-hand side image of a subject or scene while the second field to picture and reproduce the left-hand side image thereof as described above but with a single TV camera. The image of the first field is completely erased during the first vertical retrace while the image of the second field during the second vertical retrace. Switching or shutter means is provided so that during the first vertical retrace the TV camera is switched so as to focus the left-hand side image of the subject or scene during the scanning of the second field and during the second vertical retrace the TV camera is switched so as to focus the right-hand side image during the scanning of the first field. Thus one TV camera may accomplish the operations of the right-hand and left-hand TV cameras described elsewhere. The reproduction of the first and second fields is effected in a manner substantially similar to that described elsewhere so that a viewer may percieve the three-dimensional color television image.

Figure 6:
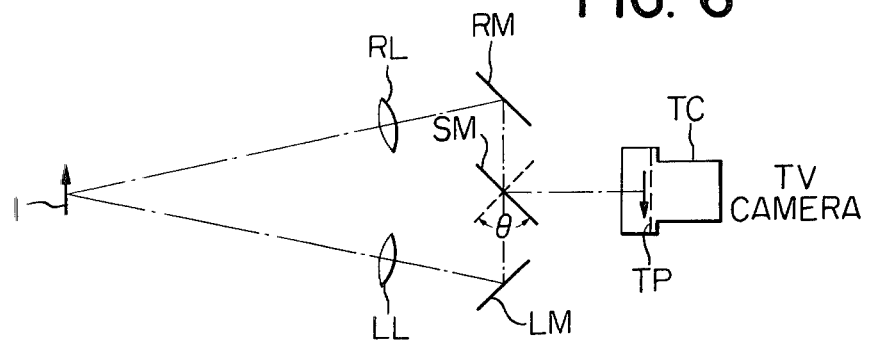
FIGS. 6–10 are schematic views of further embodiments of the present invention wherein only one TV camera is used instead of two TV cameras.

Referring to FIG. 6, a television camera system includes a right-hand side focusing optical system consisting of a lens RL and a reflecting mirror RM, a left-hand side focusing optical system consisting of a lens LL and a reflecting mirror LM, a rotary or swinging mirror SM which is said switching or shutter means and a TV camera tube TC with a signal or target plate TP. The rotary or swinging mirror SM is rotated or swung through an angle $\theta$ in synchronism with the scanning operation of the camera tube TC. Therefore during the scanning of the first field the rotary of swinging mirror SM redirects the right-hand side image of a subject or a scene 1 focused through the right-hand side optical system RL and RM to the signal or target plate TP of the camera TC and during the first vertical retrace the rotary or swinging mirror SM is so rotated or swung that during the scanning of the second field the left-hand side image of the subject or scene 1 focused through the left-hand side focusing system LL and LM may be redirected toward the signal or target plate TP. Thus the right-hand side image and the left-hand side image may be alternately focused on the target plate TP of the TV camera TC during the first and second traces.

Figure 7:
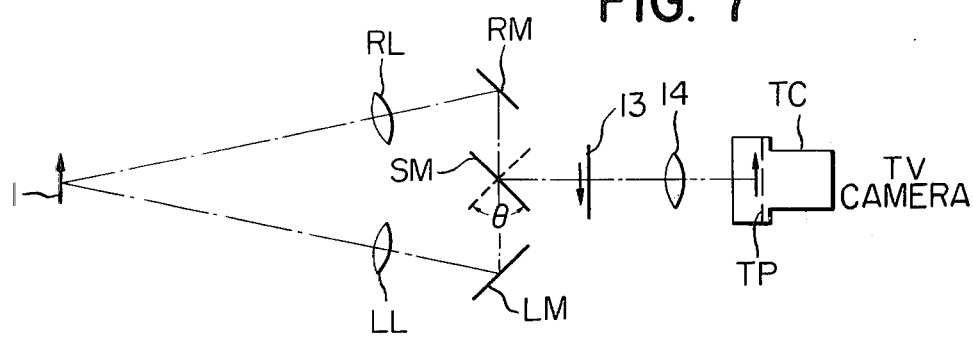

The embodiment shown in FIG. 7 is substantially similar in construction and operation to the embodiment shown in FIG. 6 except that instead of focusing the right-hand side and left-hand side images on the signal or target plate TP of the TV camera, they are focused on a three primary color strip filter 13. The image focused on the filter 13 is then focused through a relay lens 14 on the signal or target plate TP of the TV camera TC.

Figure 8:
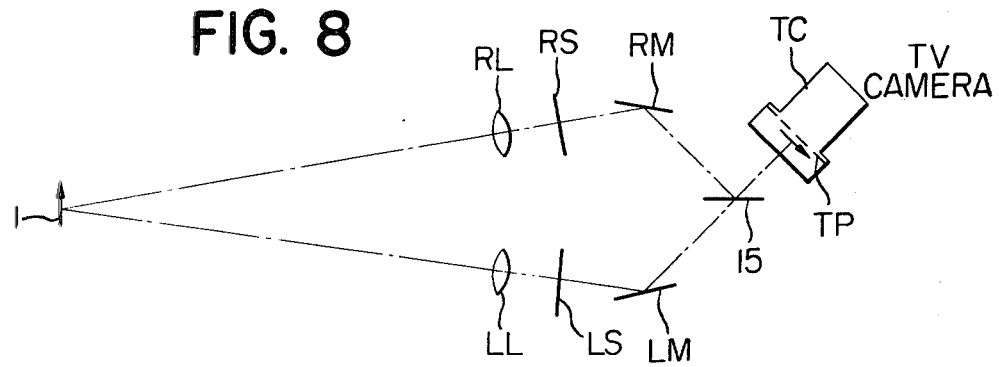

The three-dimensional color television camera system shown in FIG. 8 includes a right-hand side optical focusing system consisting of the lens RL, a shutter RS and the reflecting mirror RM, a left-hand side optical focusing system consisting of the focusing lens LL, a shutter LS and the reflecting mirror LM, a half mirror 15 and the TV camera TC with the signal or target plate TP. The shutter RS and LS are alternately opened and closed so that the right-hand side image of the subject or scene 1 may be focused on the signal or target plate TP of the TV camera TC only during the scanning of the first field whereas the left-hand side image may be focused only during the scanning of the second field through the half-mirror 15.

Figure 9:
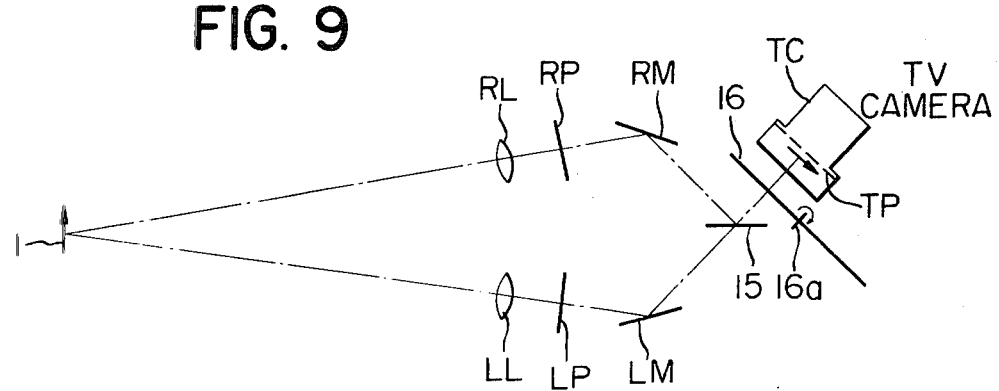

The embodiment shown in FIG. 9 is substantially similar in construction to the embodiment shown in FIG. 8 except that instead of the shutters RS and LS, optical polarizers RP and LP are disposed in such a way that the direction of polarization of the right polarizer RP is at right angles to that of the left polarizer LP. This relationship is fixed and remains unchanged. In addition, between the half mirror 15 and the signal or target plate TP of the TV camera is disposed a rotatable or swingable polarizer 16 with the axis 16a. In synchronism with the scanning operation of the TV camera TC, the rotatable or swingable polarizer 16 is caused to rotate or swing about its axis 16a in such a way that during the scanning of the first field, the polarizing angle of the polarizer 16 may exactly coincide with that of the right-hand side polarizer RP, whereby the right-hand side image of the scene 1 may be focused on the target plate TP of the TV camera TC. In like manner, the rotatable or swingable polarizer 16 is so oriented during the first vertical retrace that the polarizing angle thereof may exactly coincide with that of the left-hand side polarizer LP, whereby the left-hand side image may be focused on the target plate TP.

So far the shutters RS and LS and the polarizers RP and LP have been described as being interposed between the focusing lenses RL and LL on the one hand and the reflecting mirrors RM and LM on the other hand, but it is to be understood that they may be disposed in any suitable positions forwardly of the half mirror 15. For instance, they may be disposed in front of the focusing lenses RL and LL. Alternatively, they may be disposed between the reflecting mirrors RM and LM and the half mirror 15. Furthermore when the focusing lens RL and LL have a plurality of elements, the shutters or polarizers may be interposed between any suitable pairs of elements.

Figure 10:
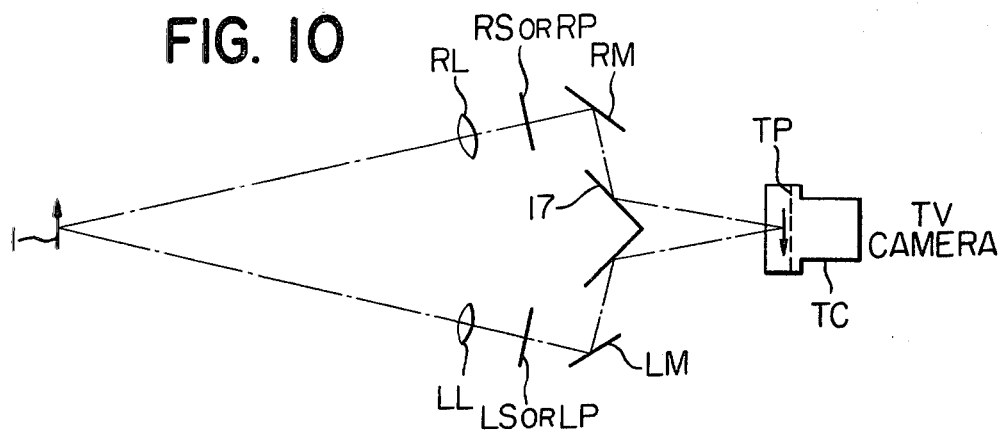

The embodiment shown in FIG. 10 is substantially similar in construction to those shown in FIGS. 8 and 9 except that instead of the half mirror 15 a dihedron full reflecting mirror 17 is used. Either of the shutters RS and LS or the polarizers RP and LP may be used. The arrangement shown in FIG. 10 is particularly advantages when the polarizers RP and LP are used as optical switching means. The reason is that when the light passes through the polarizer RP or LP, the light value is reduced to one-half and when the light passes through the half mirror 15 the light value is further reduced by one half. Thus the light image impinging on the signal plate TP has the light value which is only one quarter of the original value. However, when the full reflecting mirror 17 is used, the reduction in light value may be limited to only one half.

Figure 11:
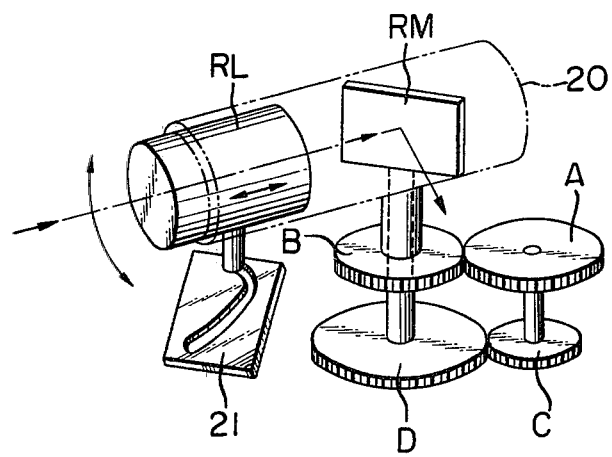
FIG. 11 is a schematic view of a focusing mechanism adapted for use with the embodiments shown in FIGS. 6–10.

FIG. 11 shows a focusing mechanism adapted for use with the three-dimensional color television camera system of the types described above. For the sake of illustration, only the right-hand side optical focusing system is shown, but the left-hand side system is substantially similar in construction. As described above, the right-hand side image of the subject or the scene 1 is focused through the focusing lens RL and the mirror RM on the signal or target plate TP of the TV camera TC. The angular displacement of the mirror RM is twice as much as that of the lens barrel 20. In this embodiment, the lens barrel 20 is angularly displaced through the gears A and B while the reflecting mirror RM through the gears C and D. Therefore the numbers of teeth of these gears A–D are so selected that when the reflecting mirror RM is rotated through an angle $\theta$ the lens barrel 20 may be rotated exactly through $\theta/2$.

In order to effect the axial displacement of the focusing lens RL in a predetermined relationship with the angular displacement of the lens barrel 20, a cam 21 is provided.

Figure 12:
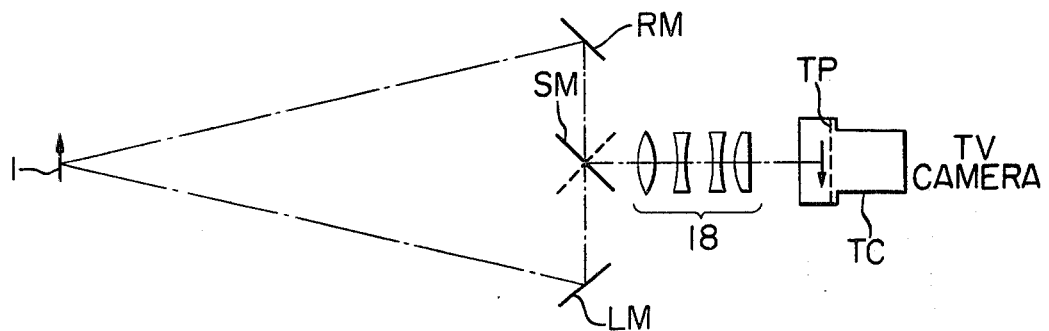
FIG. 12 shows a yet another embodiment of the present invention wherein only one optical focusing system is used.

In the embodiment shown in FIG. 12, instead of the right-hand side optical focusing system and the left-hand side optical focusing system, a single optical focusing system 18 is used. This arrangement is advantageous in that the focusing mechanism shown in FIG. 11 may be eliminated and that the TV camera with a zoom lens system may be provided at a low cost.

So far the present invention has been described in connection with the TV camera with a single tube, but it is understood that the present invention may be equally applied to the TV cameras with three tubes.

What is claimed is:

1. A stereoscopic color television image reproducing system, comprising:
   a color television picture tube having a screen comprising a multiplicity of trios of picture elements comprising color dots or strips;
   means for providing a color television signal with horizontal line interlace between successive fields, the video information in each field corresponding to a different one of two observation eyes than the video information in the immediately preceding and succeeding fields;
   means for scanning said screen during each field so that alternate ones of said picture elements are excited during each horizontal line, with picture elements in vertical alignment being excited during successive lines of the same field, each field forming a vertical strip pattern of effective scan of said picture elements, adjacent fields corresponding to two different observation eyes exciting different picture elements to provide one vertical strip pattern corresponding to a left eye image and another intermeshed vertical strip pattern corresponding to a right eye image, with horizontal line interlace between successive fields; and
   a lenticular lens disposed in juxtaposition with said screen and comprising a plurality of vertical lenticules, each lenticule being disposed in alignment with one strip of said left eye image and one strip of said right eye image, to focus said images to stereoscopically reproduce said color television signal.

2. The system according to claim 1, wherein said lenticules are prismatic.

3. The system according to claim 1, wherein said color television signal providing means comprises
   a television camera with a signal or target plate,
   a right-hand side image focusing system,
   a left-hand side image focusing system, and
   an optical switching means disposed between said television camera and said right-hand side and left-hand side image focusing systems in such a way that said optical switching means is switched between first position and second position in synchronism with the vertical scanning operation of the television camera whereby when said optical switching means is in said first position only the right-hand side image of a subject or a scene may be focused on said signal or target plate of the television camera during the scanning of the first field whereas when said optical switching means is in said second position only the left-hand side image may be focused through said left-hand side image focusing system on said signal or target plate of said television camera during the scanning of the second field.

4. The system as set forth in claim 3 wherein said optical switching means is a rotary or swinging reflecting mirror.

5. The system as set forth in claim 3 wherein said optical switching means are provided in both said right-hand side and left-hand side image focusing systems and each comprises shutter means which is opened and closed in synchronism with the vertical scanning operation of said television camera in such a way that the right-hand side image or the left-hand side image may be focused on said signal or target plate of said television camera only during the scanning time interval of the first or second field.

6. The system as set forth in claim 3 wherein said optical switching means comprises a right fixed polarizer incorporated in said right-hand side image focusing system, a left fixed polarizer incorporated in said left-hand side image focusing system and with a polarizing angle at right angles to that of said right-hand side polarizer, a half mirror disposed between the exists of said right-hand side and left-hand side image focusing systems and said color television camera, and a movable polarizer disposed between said half mirror and said color television system in such a way that said movable polarizer may be switched between first and second optical positions in synchronism with the vertical scanning operation of said color television camera, whereby when said movable polarizer is in said first position the polarizing angle thereof may coincide with that of said right polarizer so as to focus the right-hand side image may be focused on the signal or target plate of the television camera only during the scanning time interval of the first field and when said movable polarizer is in said second optical position the polarizing angle thereof may coincide with that of said left polarizer so as to as to focus the left-hand side image on said signal or target plate of said television camera only during the scanning time interval of the second field.

7. The system as set forth in claim 6 wherein instead of said half mirror a dihedron full reflecting mirror is disposed.

* * * * *

UNITED STATES PATENT OFFICE
CERTIFICATE OF CORRECTION

Patent No. 4,214,257    Dated July 22, 1980

Inventor(s) Satoshi Yamauchi

It is certified that error appears in the above-identified patent and that said Letters Patent are hereby corrected as shown below:

Column 3, lines 37, 39, 41 and Column 4, line 4: "percieved" should be --perceived--.

Column 4, lines 2 and 34: "percieve" should be --perceive--.

Column 5, lines 54-55: "advantages" should be --advantageous--.

Signed and Sealed this

Sixth Day of January 1981

[SEAL]

*Attest:*

*Attesting Officer*

SIDNEY A. DIAMOND

*Commissioner of Patents and Trademark*